United States Patent [19]
Crane et al.

[11] Patent Number: 5,901,242
[45] Date of Patent: * May 4, 1999

[54] METHOD AND APPARATUS FOR DECODING SPATIOCHROMATICALLY MULTIPLEXED COLOR IMAGES USING PREDETERMINED COEFFICIENTS

[75] Inventors: Hewitt D. Crane, Portola Valley; John D. Peters, Sunnyvale; Eugenio Martinez-Uriegas, Palo Alto, all of Calif.

[73] Assignee: SRI International, Menlo Park, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/675,151

[22] Filed: Jul. 3, 1996

[51] Int. Cl.⁶ .................................................. H04N 1/415
[52] U.S. Cl. .......................... 382/166; 358/525; 358/539
[58] Field of Search ..................... 358/539, 525; 382/232, 233, 166; 348/262, 264, 265, 266, 272, 273, 277, 393–395; H04N 1/415

[56] References Cited

U.S. PATENT DOCUMENTS

| | | | |
|---|---|---|---|
| 4,591,900 | 5/1986 | Heeb et al. | 348/277 |
| 4,642,678 | 2/1987 | Cole | 348/242 |
| 5,373,322 | 12/1994 | Laroche et al. | 348/273 |
| 5,418,565 | 5/1995 | Smith | 348/273 |
| 5,506,619 | 4/1996 | Adams, Jr. et al. | 348/272 |
| 5,541,653 | 7/1996 | Peters et al. | 348/264 |
| 5,768,427 | 6/1998 | Pan et al. | 382/166 |

FOREIGN PATENT DOCUMENTS

| | | |
|---|---|---|
| 0 632 663 A2 | 1/1995 | European Pat. Off. . |
| 05076015 | 3/1993 | Japan . |

*Primary Examiner*—Kim Yen Vu
*Attorney, Agent, or Firm*—Townsend and Townsend and Crew LLP

[57] ABSTRACT

Color image decoding is achieved by a simplified method of decoding a spatially and chromatically multiplexing image plane (32), such as a plane consisting of RGB (Red-Green-Blue) pixels (22) by performing a summation of pixels of all three colors in a neighborhood of a missing pixel. The decoding process has applications in decoding images made by a data processor, made by an imaging device with a mosaic color filter, or made by a multi-sensor CCD imaging device with a sensor offset (800). Various techniques of entropy reduction, smoothing and speckle reduction may be incorporated into the coefficient pattern. The coefficient pattern may be generated automatically using a process of correlated decoding and may be adjusted by hand using a process of trial and error.

19 Claims, 16 Drawing Sheets

| Field 1 | G | G | G | R |
|---|---|---|---|---|
| Field 2 | G | R | G | G |
| Field 1 | G | G | G | B |
| Field 2 | G | B | G | G |

Field-Staggered 3G CFA

| Field 1 | G | G | G | R |
|---|---|---|---|---|
| Field 2 | G | G | G | R |
| Field 1 | G | B | G | G |
| Field 2 | G | B | G | G |

Line-Staggered 3G CFA

| G | B | G | R |
|---|---|---|---|
| R | G | B | G |
| G | B | G | R |
| R | G | B | G |

Interline Geometry CFA

| G | R | G | R |
|---|---|---|---|
| B | G | B | G |
| G | R | G | R |
| B | G | B | G |

Bayer

| G | R | G | R |
|---|---|---|---|
| G | R | G | R |
| B | G | B | G |
| B | G | B | G |

Modified Bayer

| G | R | G | R |
|---|---|---|---|
| G | B | G | B |
| B | G | B | G |
| R | G | R | G |

Green Checker Field Sequence

| | | | | | | ← 409 |
|---|---|---|---|---|---|---|
| -0.012500 | | 0.015625 | | -0.012500 | | |
| | | | -0.050000 | | | |
| 0.015625 | | -0.025000 | | 0.171875 | | -0.075000 |
| | -0.050000 | -0.200000 | 0.150000 | -0.200000 | -0.050000 | |
| -0.025000 | | 0.500000 | 0.800000 | 0.275000 | | 0.093750 |
| | -0.050000 | -0.200000 | 0.150000 | -0.200000 | -0.050000 | |
| 0.015625 | | -0.025000 | | 0.171875 | | -0.075000 |
| | | | -0.050000 | | | |
| -0.012500 | | 0.015625 | | -0.012500 | | |

Figure 7B

|  |  | -0.0020 |  | 0.0025 |  | -0.0020 |  |  |  |  |
|---|---|---|---|---|---|---|---|---|---|---|
|  |  |  | -0.0040 |  | -0.0040 |  |  |  |  |  |
| -0.0020 |  | 0.0100 |  | -0.0230 |  | 0.0125 |  | -0.0040 |  |  |
|  | -0.0040 |  | 0.0080 |  | -0.0760 |  | -0.0080 |  |  |  |
| 0.0025 |  | -0.0230 |  | -0.0400 | 0.2500 | -0.1420 |  | 0.0125 |  | -0.0020 |
|  | -0.0040 |  | -0.0760 | 0.2500 | 0.7360 | 0.2500 | -0.0760 |  | -0.0040 |  |
| -0.0020 |  | 0.0125 |  | -0.1420 | 0.2500 | -0.0400 |  | -0.0230 |  | 0.0025 |
|  |  |  | -0.0080 |  | -0.0760 |  | 0.0080 |  | -0.0040 |  |
|  |  | -0.0040 |  | 0.0125 |  | -0.0230 |  | 0.0100 |  | -0.0020 |
|  |  |  |  |  | -0.0040 |  | -0.0040 |  |  |  |
|  |  |  |  | -0.0020 |  | 0.0025 |  | -0.0020 |  |  |

|  |  | -0.0500 |  | 0.0625 |  | -0.0500 |
|---|---|---|---|---|---|---|
|  |  |  | -0.2000 |  |  |  |
| -0.0500 |  | 0.3750 |  | 0.1500 |  | 0.0625 |
|  | -0.2000 |  | 0.8000 |  | -0.2000 |  |
| 0.0625 |  | 0.1500 |  | 0.3750 |  | -0.0500 |
|  |  |  | -0.0200 |  |  |  |
| -0.0500 |  | 0.0625 |  | -0.0500 |  |  |

| 0.05000 |  | -0.00625 |  | 0.01000 |  | -0.00625 |  | 0.00500 |
|---|---|---|---|---|---|---|---|---|
|  |  |  | 0.02000 |  | 0.02000 |  |  |  |
| -0.00625 |  | -0.08000 |  | 0.01250 |  | -0.08000 |  | -0.00625 |
|  | 0.02000 |  | -0.14000 | 0.25000 | -0.14000 |  | 0.02000 |  |
| 0.01000 |  | 0.01250 | 0.25000 | 0.66000 | 0.25000 | 0.01250 |  | 0.01000 |
|  | 0.02000 |  | -0.14000 | 0.25000 | -0.14000 |  | 0.02000 |  |
| -0.00625 |  | -0.08000 |  | 0.01250 |  | -0.08000 |  | -0.00625 |
|  |  |  | 0.02000 |  | 0.02000 |  |  |  |
| 0.00500 |  | -0.00625 |  | 0.01000 |  | -0.00625 |  | 0.00500 |

Figure 7E

|  | -0.20 |  | 0.25 |  | -0.20 |
|---|---|---|---|---|---|
|  |  |  |  |  |  |
|  | 0.25 |  | 0.80 |  | 0.25 |
|  |  |  |  |  |  |
|  | -0.20 |  | 0.25 |  | -0.20 |

| | | 0.0036 | | -0.0045 | | 0.0036 | | |
|---|---|---|---|---|---|---|---|---|
| | | | 0.0072 | | 0.0072 | | | |
| 0.0036 | | -0.0180 | | 0.0128 | | -0.0180 | | 0.0036 |
| | 0.0072 | | -0.0344 | 0.2500 | -0.0344 | | 0.0072 | |
| -0.0045 | | 0.0128 | 0.2500 | 0.0900 | 0.2500 | 0.0128 | | -0.0045 |
| | 0.0072 | | -0.0344 | 0.2500 | -0.0344 | | 0.0072 | |
| 0.0036 | | -0.0180 | | 0.0128 | | -0.0180 | | 0.0036 |
| | | | 0.0072 | | 0.0072 | | | |
| | | 0.0036 | | -0.0045 | | 0.0036 | | |

METHOD AND APPARATUS FOR DECODING SPATIOCHROMATICALLY MULTIPLEXED COLOR IMAGES USING PREDETERMINED COEFFICIENTS

BACKGROUND OF THE INVENTION

This invention relates to decoding spatiochromatically multiplexed digitized color images with applications to compression, transmission, reception, storage, and improving image quality.

Related background material and disclosure are found in coinvented and coassigned U.S. Pat. No. 5,398,066, (the '066 patent) and coinvented and coassigned U.S. application Ser. No. 08/401,825, filed Mar. 10, 1995, U.S. Pat. No. 5,541,653, both incorporated herein by reference for all purposes. Other background information and descriptions of the prior art may be found in the references cited and submitted along with those applications.

As the above referenced documents thoroughly describe, in digital image processing, a representation of an image is typically stored and transmitted as an array of numerical values. The image is divided up into a grid. Each small square in the grid is referred to as a pixel. The intensity of the image at each pixel is translated into a numerical value which is stored in an array. The array of numerical values representing an image is referred to as an image plane.

Black and white (gray scale) images are commonly represented as a two-dimensional array where the location of a pixel value in the array corresponds to the location of the pixel in the image. Each location in the array for gray scale images can commonly store a number, for example, an integer value of between 0 and 255 (an 8-bit binary number). This means that there can be 1 of 256 different gray levels displayed at each pixel in the image.

Color images are commonly represented by three two-dimensional arrays. Each array (or plane) represents one of the primary colors, e.g., red, green, or blue. The planes overlap so that each pixel in the displayed image displays a composite of a red, green, and blue value at that pixel. In a common 24-bit color system, each pixel in each of the three planes can store a value of between 0 and 255. This means that there can be 1 of $256^3$ or 16 million different colors displayed at each pixel. Typical digital color images can range in size from $10^7$ bits/image (a TV frame) to $10^{10}$ bits/image (a satellite image) thus posing problems for efficient storage and transmission.

In practice the number of bits required to represent the information in realistic digital images may be greatly reduced without significant loss in perceived quality by taking advantage of the fact that in ordinary images the pixel values tend to be strongly redundant in three domains: spectral (because pixel values from different spectral bands-e.g., RGB-are generally highly correlated); spatial (because neighboring pixels also tend to be highly correlated); and, for dynamic images, temporal (because consecutive frames tend to be very similar). Image compression techniques can reduce the number of bits required to represent images by removing these redundancies.

The above cited references discuss one type of prior art digital color image system having a single array CCD-type cameras with a mosaic color filter covering the CCD array. These cameras, by their inherent nature, produce a representation of an image that contains just one color component at every pixel. The arrangement of the components is determined by the mosaic pattern in the filter. Digital images produced by such systems are referred to as being spatiochromatically multiplexed.

The above cited references also discuss two other means of producing a spatiochromatically multiplexed digital image plane, (hereinafter referred to as an M plane) either by decoding a 3-plane image as described in the '066 patent or by using a multiple array CCD-type cameras with array offset and interpreting the multiple array CCD image as a single spatiochromatically multiplexed plane and then decoding that plane to produce a resolution enhanced image as described in the '825 application.

However the M plane is produced, and whatever the pattern of spectral pixels in the M plane, the M plane must generally be decoded before viewing to recreate full multi-spectral image planes. Prior art methods for decoding spatiochromatically multiplexed digital images have commonly required that the image first be decoded as a YIQ JPEG image before being reconstructed as a full three-plane RGB image, as discussed in previously cited references.

The inventors of the present invention described in the '066 patent a method and system for decoding spatiochromatically images directly, without conversion to another color representation such as YIQ. This decoding has proven and been described as useful for any spatiochromatically multiplexed plane, regardless of how produced, including multiplexed planes using just two spectral components.

While this has been shown to be a simplification and improvement over systems that require YIQ conversion, even in this decoding, a multi-pass mathematically process is required to decode high-quality images. This process can be complex to implement and can consume a large amount of computer resources.

What is need is a method and system capable of more quickly and efficiently decoding a spatiochromatically multiplexed image plane to derive a full multi-spectral image. Preferably, the method will be generalizable to advantageously decode a number of different types of spatiochromatically multiplexed planes while requiring a minimum of calculations and processing.

SUMMARY OF THE INVENTION

According to the invention, a spatially and chromatically multiplexed multi-spectral image comprising at least two digitized multi-spectral planes consisting, for example, of RGB (Red-Green-Blue), is decoded into a multispectral image using a simplified correlated decoding method. The simplified correlated decoding method consists of determining a missing pixel value in one spectral plane by computing a weighted sum of pixel values in multiple spectral planes in the neighborhood of the missing pixel. The weighted sum is computed using a specific pattern of values in each spectral plane, said specified pattern being possibly different for different pixel positions from the same spectral plane in the spatiochromatically multiplexed plane.

The invention may be employed in conjunction with any number of types of color imaging devices. A color imaging device may be a multi-receptor device with an off-set among receptors in which case the invention may effectively increases the resolution of the captured image by decompressing the data from the imaging device. A color imaging device may also be an imaging device that contains only two sensors, say one for R and one for G, for use in special applications such as processing bank documents where material written or stamped in red (or another color) must be distinguishable from other writing.

The present invention will be described with reference to the handling of realistic color images encoded in the RGB color primaries. However, it will be apparent to one of ordinary skill in the art that there are alternative multi-spectral uses for the invention. One alternative would be to use the invention in a color system that employs primaries other than RGB for color representations, such as systems that use cyan, magenta, and yellow. Another alternative would be to use the invention in systems that process different types of multi-spectral data, such as images from a satellite, images from infra-red detectors or images from x-ray detectors.

The invention will be better understood upon reference to the following detailed description in connection with the accompanying drawings.

BRIEF DESCRIPTION OF THE DRAWINGS

FIGS. 6A–C are diagrams illustrating the decoding of missing pixel values at various sampled pixel locations in the example cell of FIG. 5 according to an embodiment of the invention.

FIGS. 7A–H are diagrams illustrating examples of coefficient values for the decoding of missing pixel values at various sampled pixel locations according to an embodiment of the invention.

DESCRIPTION OF THE PREFERRED EMBODIMENT

Definitions and Terminology Related to Digital Image Processing and Compression

In the specification, the uppercase letters R, G, B, and M are used to indicate two-dimensional arrays of values representing an image or a separable component of an image. The two-dimensional arrays of values are also referred to as "planes." For example, the R plane refers to a two-dimensional array of values that represent the red component at every location (pixel) of an image. The letter groups RGB and YIQ indicate three-dimensional arrays of values representing an image as a composite of overlaid separable image component planes. M is used to represent a spatiochromatically multiplexed plane.

Uppercase letters used with an asterisk (*) (such as RGB*, M*, R*, G*, or B*) are used to indicate an array of values representing an image or a separable component of an image after some type of processing has been done to the image values.

The lowercase letters r, g, and b are used to refer to an individual pixel in an image plane. These letters are used with a subscript s ($r_s$, $g_s$, or $b_s$) to indicate a pixel value that is directly sampled from the original image and is not changed. These letters are used with a subscript c ($r_c$, $g_c$, or $b_c$) to indicate a pixel value that is computed by a component of the image decompression system of the invention.

Angle brackets <> are used to indicate a local average value computed from the pixels in a local submatrix of an image plane.

The terms decode kernel or decode matrix are used to denote a pattern of samples that is used to determine a missing pixel values and associated coefficients. Decode kernels are moved around an M plane and rotated with the center of the kernel placed over the pixel for which missing values are being decoded. There are a number of different decode kernels for pixels in an M plane, depending on where the pixels are located within the minimum cell.

System Overview

Figure 1:
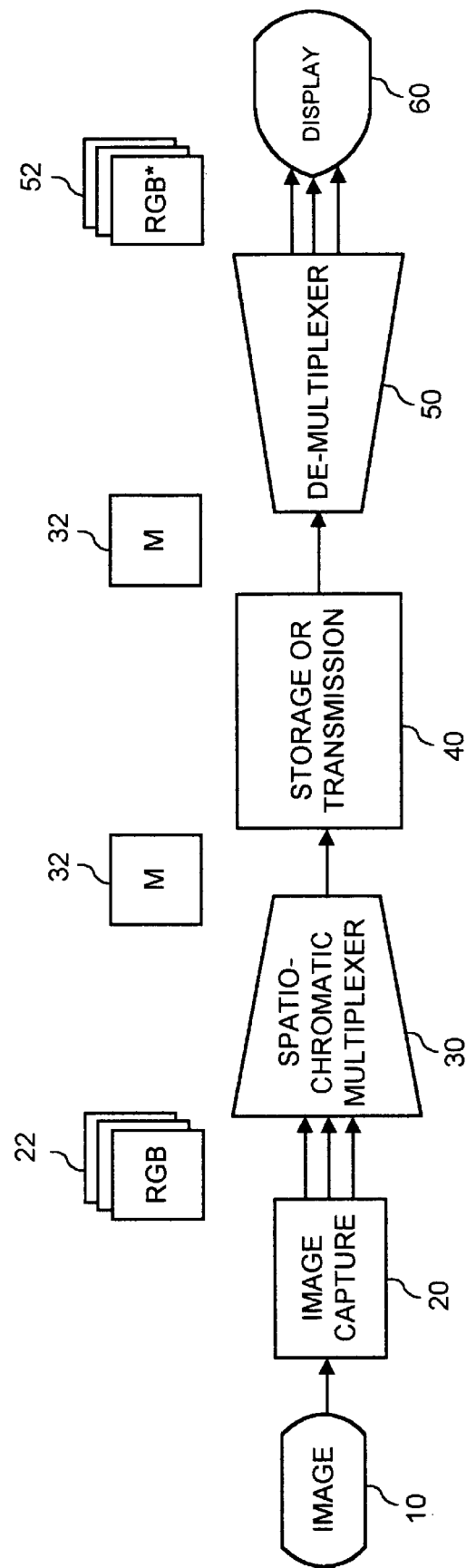
FIG. 1 is a block diagram of an example of a data compression system employing basic multiplexing and demultiplexing processes in which decoding according to the invention may be employed.

FIG. 1 is a block diagram of a specific embodiment of an image compression and decompression system of one type in which the present invention may be employed. This system is presented for illustration purposes only, and it should be understood that the techniques of the invention may be used with different types of spatiochromatically multiplexed images.

As shown in the figure, a full color scene 10 is presented to image capturing means 20. Capture means 20 captures a multi-spectral image with data from a plurality of discrete spectral components (e.g. R, G, & B) captured at every picture element (pixel) location. Capture means 20 may be a digital scanner coupled to a random access memory, or it may be any type of analog or digital camera coupled to a storage means such as a computer memory or a magnetic or optical recording medium. Capture means 20 may also be a means for receiving an image that had previously been stored in a random access memory, on video tape, or a laser disk, etc., or for receiving an image created by a computer. The representation of the image in the image capture means 20 in this example is a three-plane RGB array, indicated by icon 22.

Once the image is present in the capture means 20, it is presented to image multiplexer 30, which constructs a new data representation of the image 32, called an M plane (for "multiplexed" plane), by, in one embodiment, extracting at every pixel information regarding just one spectral component of the image. Multiplexer 30 may operate in detail as described in the '066 patent. For an image made up of three separable spectral components, multiplexer 30 therefore "compresses" the data needed to represent the source image to ⅓ the size of the original data based on a three-plane source representation. This compressed data is then received by transmission or storage means 40, which can be any means known for transmitting or storing electronic information. After transmission or storage, decoder 50 decodes the multiplexed plane using the method of the invention to recover RGB* plane 52, which is a close approximation of the full data set initially captured in capture means 20. That data set is presented to display device 60 which displays the data for viewing.

Figure 2:
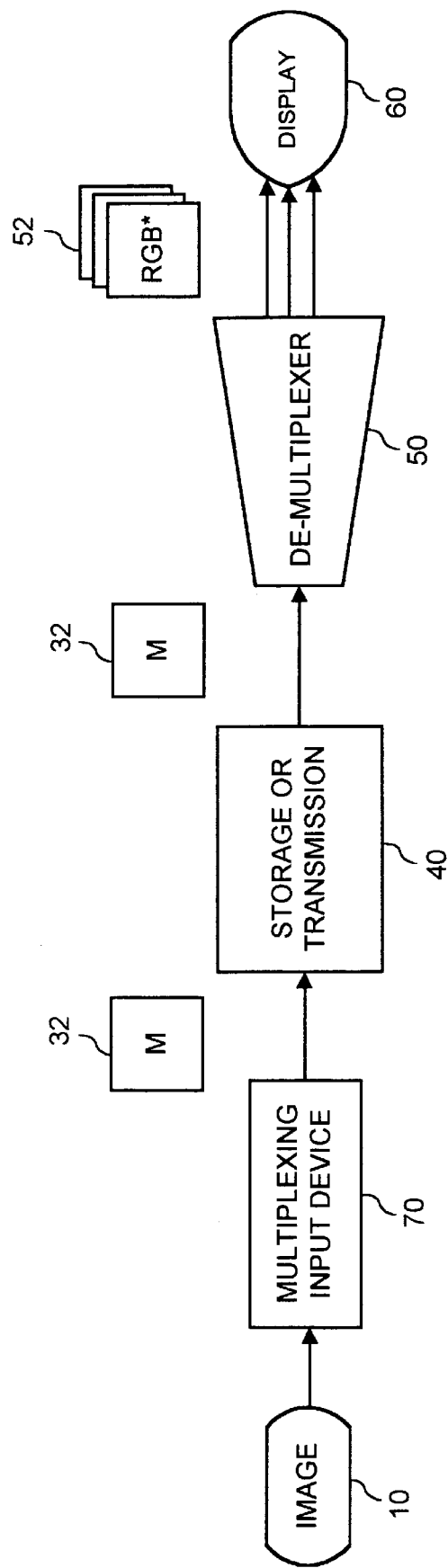
FIG. 2 is a block diagram of an alternative embodiment data compression system employing a multiplexing input device.

FIG. 2 is a block diagram of an alternative system in which the invention may be employed using a multiplexing input device 70. Multiplexing input device 70 can be any means known for directly capturing a multiplexed plane from an image, such as a CCD sensor camera with a mosaic color filter, or, in an embodiment described more fully below, a multi-sensor CCD camera with an off-set among the sensors. In this embodiment, the image never exists as a full RGB plane before being multiplexed into an M plane. The M-plane output of multiplexing input device 70 is directly input to storage or transmission means 40. Demultiplexer 50 receives this output and demultiplexes it to produce RGB* planes 52 which are a close approximation of what a full RGB representation of the image would have looked like. In one example, the device uses a unique mosaic filter arrangement and processing to achieve high levels of image compression and superior image reproduction with a minimum of computational overhead. In another example, the device uses a multi-sensor CCD camera with an off-set among sensors as a multiplexing input device.

The M Plane

The present invention is directed to decoding an M plane such as 32. This plane may have any number of different patterns of pixels, with a primary characteristic being that the plane is spatially multiplexed. In general, at each location in the M plane, a pixel value for just one spectral component is present, and which spectral component is present depends on the location of the pixel in the M plane. (The invention may also have applications to hybrid M planes, in which each location includes values from more than one spectral plane.)

When the M plane is expanded, the spectral value present at a given location in the M plane is sometimes referred to as the sampled value, because that value typically represents a directly sampled value from the full spectral image.

Figures 3A, 3B:
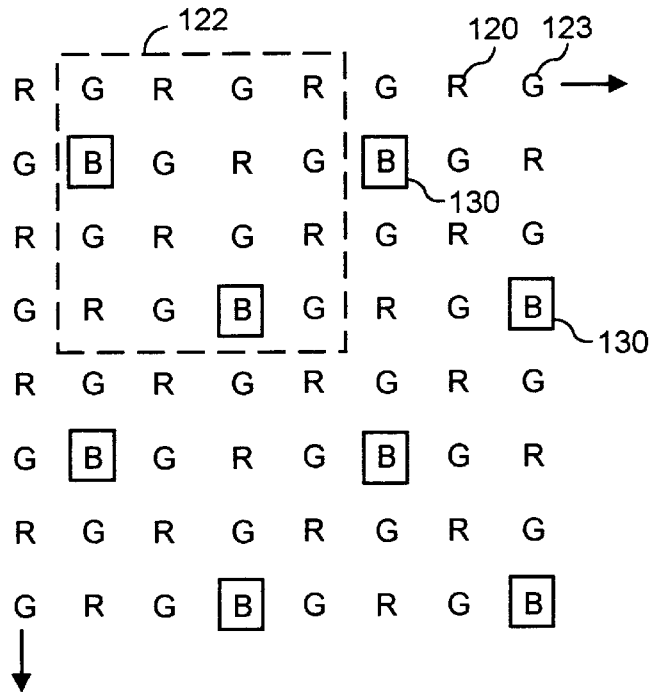
FIGS. 3A–B are diagrams of different examples of spatiochromatically multiplexed planes of digital data on which the invention may be advantageously employed according to various embodiments of the invention, with an indication of a minimum cell of one particular periodic spatiochromatically multiplexed plane of digital data used as an example in illustrating the invention.

FIG. 3A is a diagram of an 8×8 pixel region in a spatiochromatically multiplexed image plane such as M plane 32. This diagram represents one example of a type of spatiochromatically multiplexed image on which the present invention may be effectively employed. The letters R, G and B in FIG. 3A each represent the location of one pixel in the M plane and indicate the color component stored in that pixel. For example, R pixel 120 stores a value $r_s$, which is the sampled value of the red component from that location in the original source RGB planes. Likewise, G pixel 123 stores the sampled green component $g_s$ from the RGB plane at that location. B pixel 128 stores a value b which, according to the '066 patent can be either the average $b_s$ of the blue values in a submatrix of the original image or a sampled value $b_s$ from the original image, as described in the '066 patent. This particular pattern and some related patterns are referred to as Chromoplex(TM) patterns by the assignees of the present invention.

M plane 32 uses ⅓ of the data space to represent the image as did the original RGB planes, because each pixel R, G, or B in the M-plane stores the value of only one of the 3 RGB planes and discards the value of the other two planes. Thus 3 to 1 data compression is achieved from the spatiochromatic multiplexing.

FIGS. 3B illustrates other possible configurations for M plane 32 which may also be decoded according to the present invention. These include the well-known Bayer-pattern, field-staggered 3G CFA, line-staggered 3G CFA, interline geometry CFA, modified Bayer, and green checker field sequence. Other patterns can also be decoded by the invention, such as patterns in use by Sony Corporation, the Sanyo pattern of lines of alternating color, or any other pattern for constructing a spatially multiplexed M plane.

In the case where an M-plane is produced directly by a CCD-type device with a mosaic filter, such as a CCD camera or flat bed or other type scanner, FIGS. 3A–B would also represent the patterns of the red, green and blue filters that would be used in a filter mosaic of a multiplexing input device such as 70.

Different factors will underlie the form of the sampling patterns as shown in FIGS. 3. If the final image is intended to be a real-world image intended for viewing by humans, G may dominate the chosen M-plane pattern, followed by R samples, because there is evidence that the human eye is more sensitive to the G primary than to the R primary, and much less sensitive to the B primary. Patterns designed to optimize for human vision therefore may include more G and R values than B values.

Where the image will be quantized by JPEG or any other compression scheme, the chosen pattern is affected by the requirements of the scheme. For example, in JPEG, the fact that one strict aspect of the standardized JPEG scheme is the basic 8×8 size of pixel blocks, which defines the range of the basis functions for the cosine transform. An even submultiple of the standard is therefore desired so that any possible phase-induced effects of multiplexing will not be present with respect to the JPEG basis functions required to transform the image into the spatial-frequency domain.

M-plane images used to process two color bank-documents, or for satellite or X-ray images will have different optimal M-plane patterns depending on the application.

The Minimum Cell

One characteristic that various types of M-plane patterns will have in common is that they are periodic, meaning there is some basic minimum pattern that is repeated as often as needed to make up the full M-plane. This minimum pattern is referred to as a minimum cell, and one example of a minimum cell is shown as 122 in FIG. 3A and FIG. 5. According to one embodiment, the present invention simplifies the process of correlated decoding by analyzing this minimum cell to determine appropriate coefficients to use in decoding missing pixel values, and then uses those same coefficients on corresponding pixel locations throughout the M-plane.

Image Decoding

Figure 4:
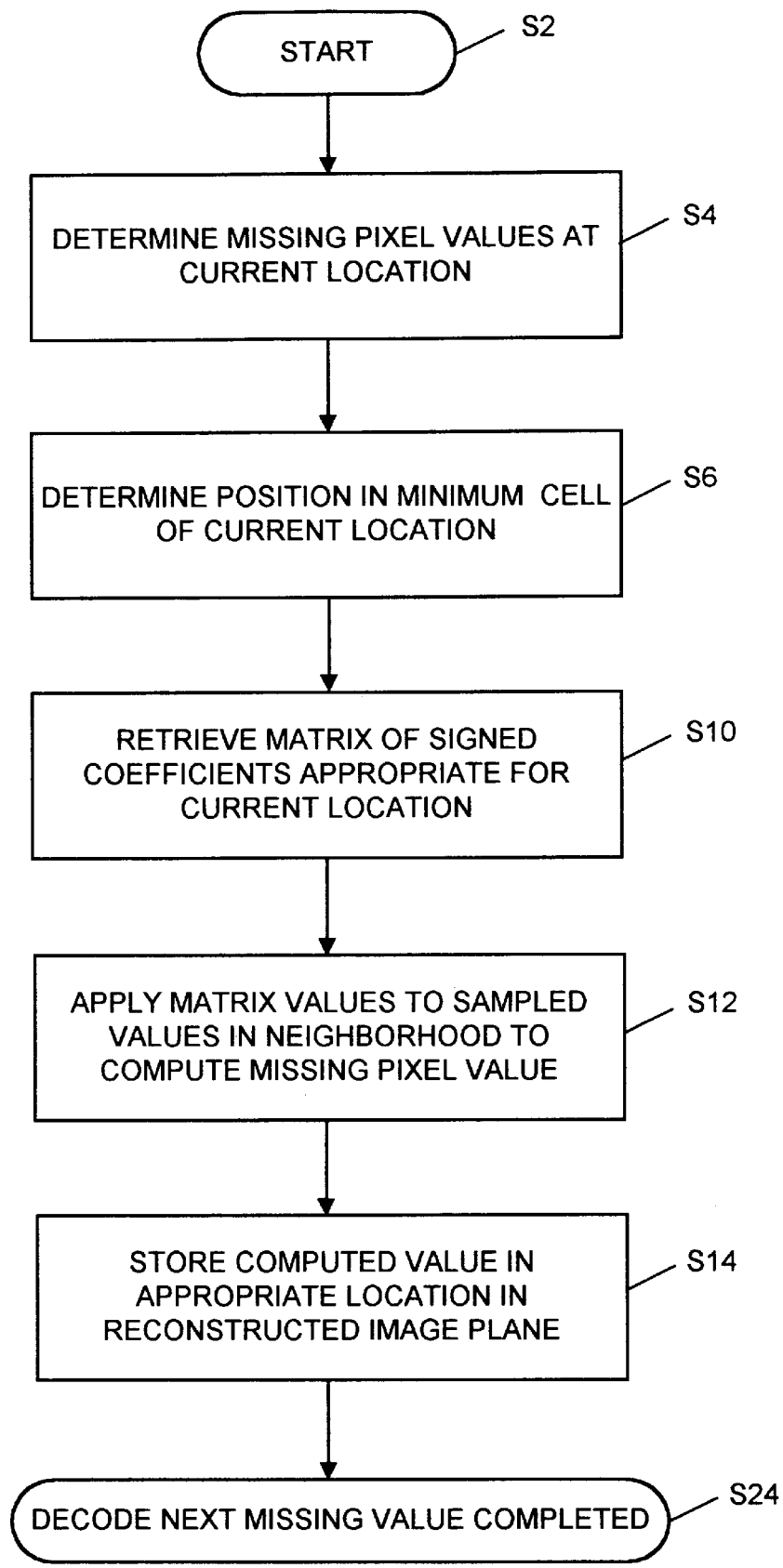
FIG. 4 is a flowchart of the generalized decoding method according to the invention.

In general, image decoding consists of a decoder such as 50 examining each pixel position in the M plane in turn. As previously described and as shown in FIGS. 3 and 4, the M plane contains a value representing just one spectral plane at that location. Decoding the M plane consists of determining an approximation for the missing spectral components at each location. According to the previously cited patents, this is accomplished by a process of correlated decoding, where the difference between the value present at a given location and surrounding values in its spectral plane is correlated to the difference between a calculated value in a different spectral plane and values in the other spectral plane.

The previously referenced patents described several alternative methods for decoding an M plane. These methods incorporated a number of different possible processes to enhance the quality of the overall image, including reducing color speckles, blurriness, and pattern noise. In the earlier cited patents, after the initial approximation of a missing pixel, high quality decoding required a number of passes through the decoded planes, with each pixel and its neighborhood visited numerous times before obtaining the final decoded pixel values.

The previously disclosed decoding had several discrete steps that had to be done in order, each one over the entire image, because each step was dependent on the steps that preceded it. This is not an optimal type of algorithm because each step's results must be saved in a buffer before moving on to the next step. This is expensive in terms of time and/or buffer memory. According to an embodiment of the present invention, these multiple passes through the M plane are eliminated, and a decoder such as 50 may accomplish effective decoding in just one pass using an expanded coefficient matrix to compute a weighted sum for each missing pixel value.

FIG. 6 is a flow chart of a general procedure of M plane decoding function of an embodiment of the invention. At a current location at which missing pixel values will be decoded, a demultiplexer first determines which pixel values are missing at that location (S4). According to a specific embodiment, the demultiplexer then determines which position in the minimum cell is being decoded and selects an appropriate sampling pattern for that location (S6) to determine missing values. The demultiplexer then retrieved a matrix of signed weighting factors for that sampling pattern (S10). The demultiplexer then determines a value for the missing pixel by performing a summation of the weighted sampled values, taking the sampled values from various spectral planes in accordance with the retrieved matrix, applying the weighting coefficients, and performing a sum to obtain the missing pixel value (S12). The computed value is then stored in the appropriate location in the reconstructed image plane (S14). Decoding of one missing pixel value at one location in the M plane now complete, the method loops to the next missing pixel value (S24).

Specific Examples of Decoding Sample Patterns

According to the invention, the decoding matrices for a given pixel location will be based on the specific arrangement of sampled values in the minimum cell of the M plane around that location. In some configurations of minimum cells, there will be some pixel locations within the cell that have the same sampling pattern around them and therefore the same decoding matrix. Other pixel locations may have a decoding matrix that is easily derivable from that for another locations, such as by a rotation of the matrix.

Figure 5:
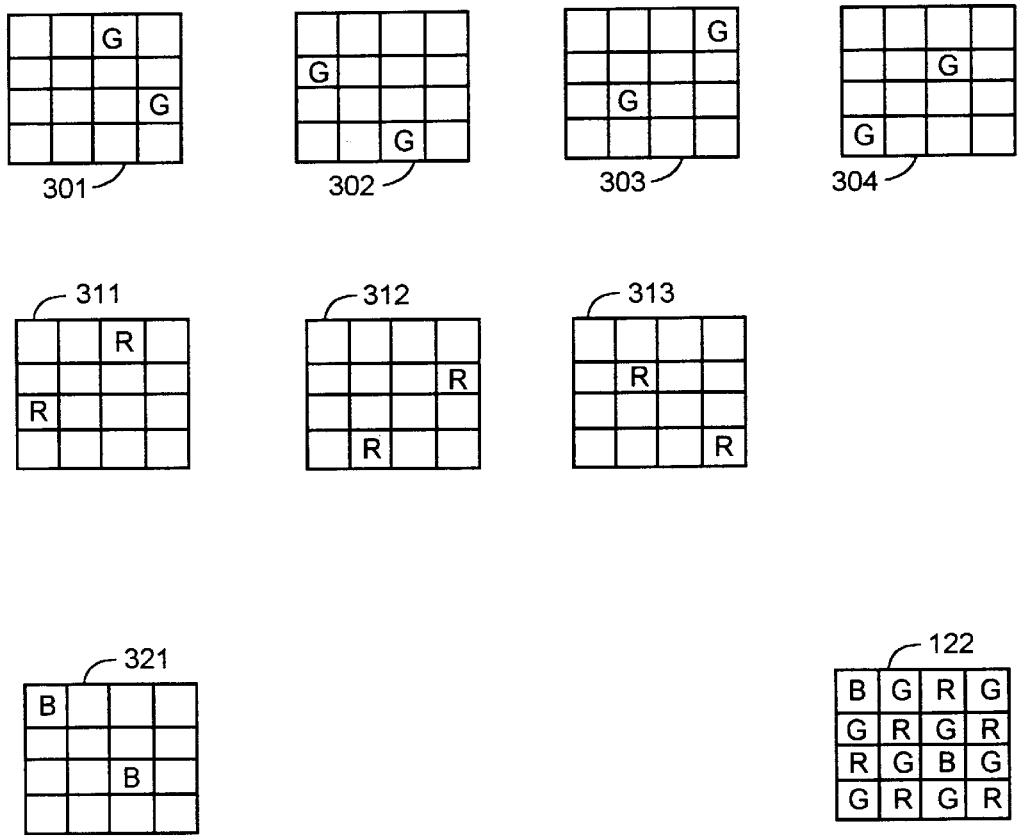
FIG. 5 is a diagram of a minimum cell showing grouping of different sample pixel pairs for which similar decoding patterns are used according to the invention.

As an example, FIG. 5 shows minimum cell 122 from a Chromaplex(TM) pattern, with eight pairs of pixel locations shown at the bottom, with the two pixel locations in any pair having the same decoding matrix. As shown in FIG. 5, there are four pairs of equivalent G positions, three pairs of equivalent R positions, and 1 pair of equivalent B positions. For each location, two decoding patterns are needed to decode the two missing pixel values at those locations.

Figure 6A:
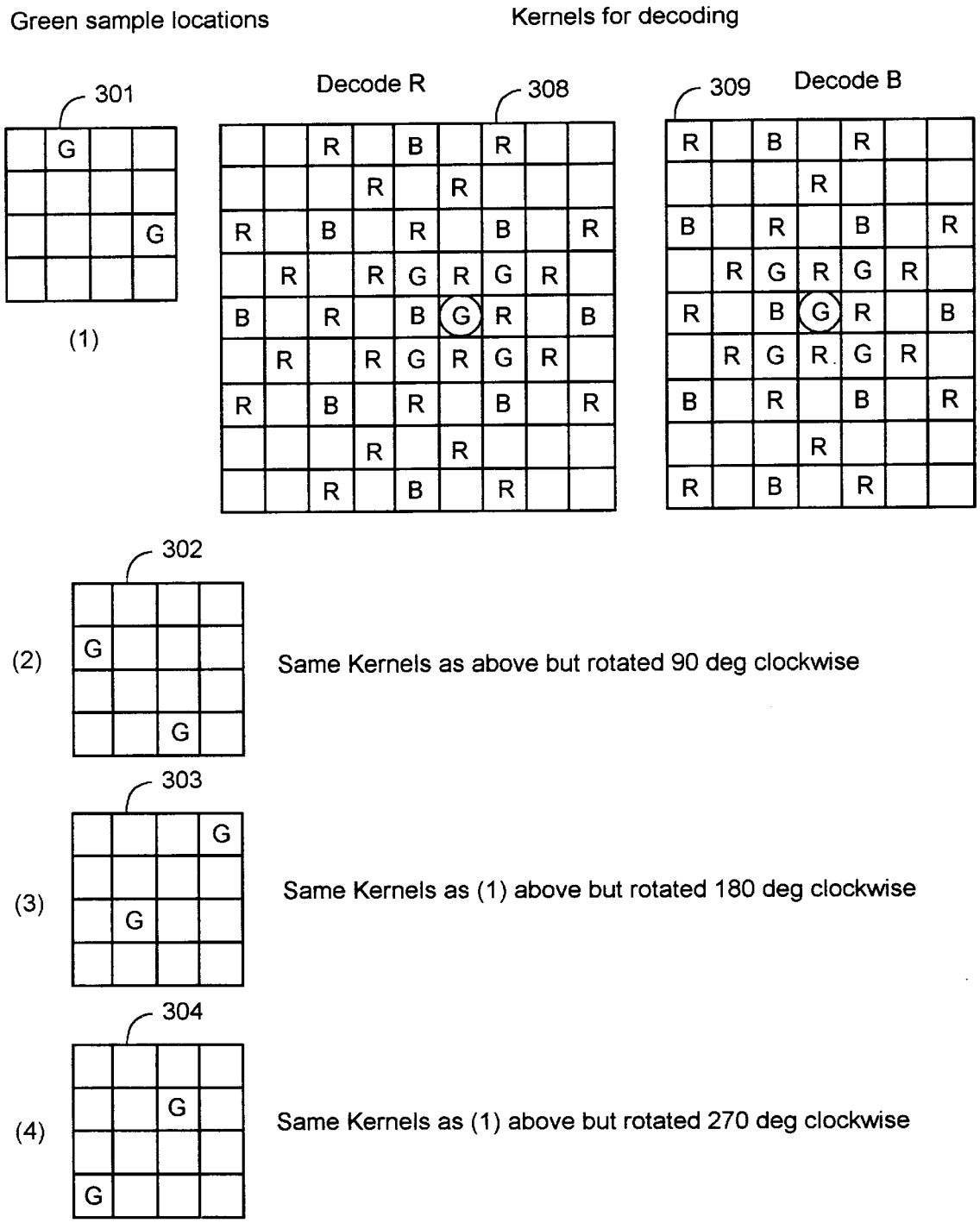
Figure 6B:
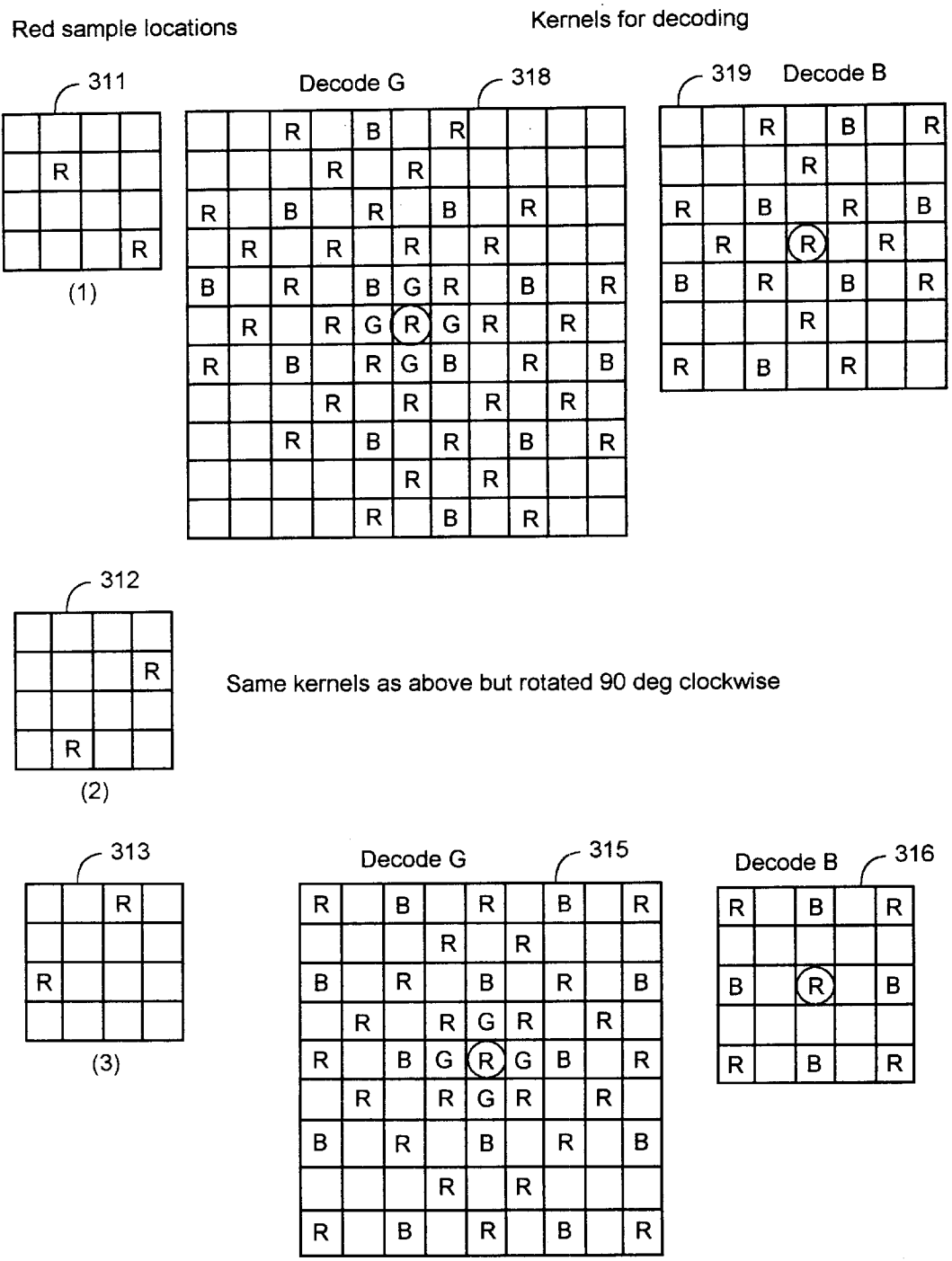
Figures 6C, 7A:
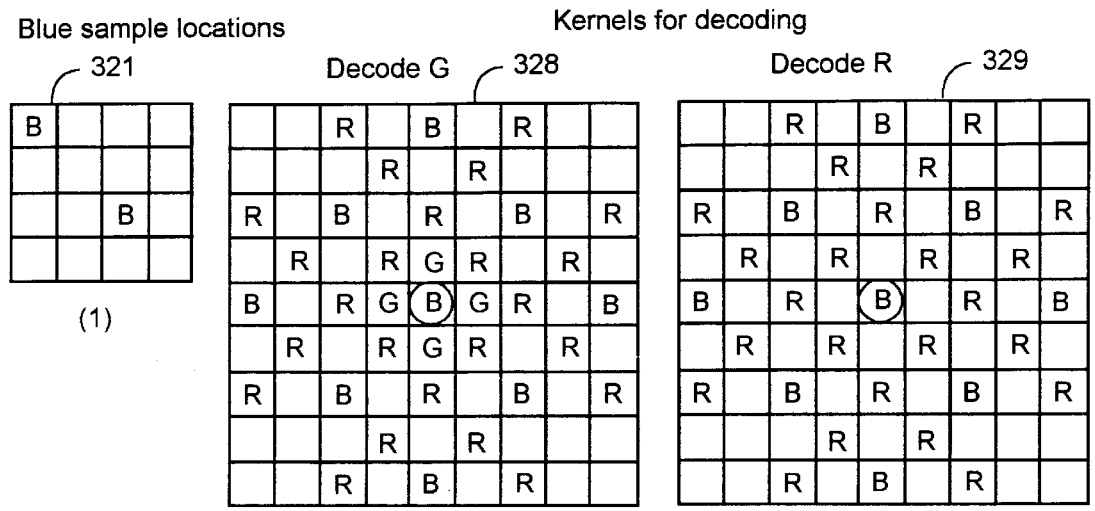
Figure 7H:
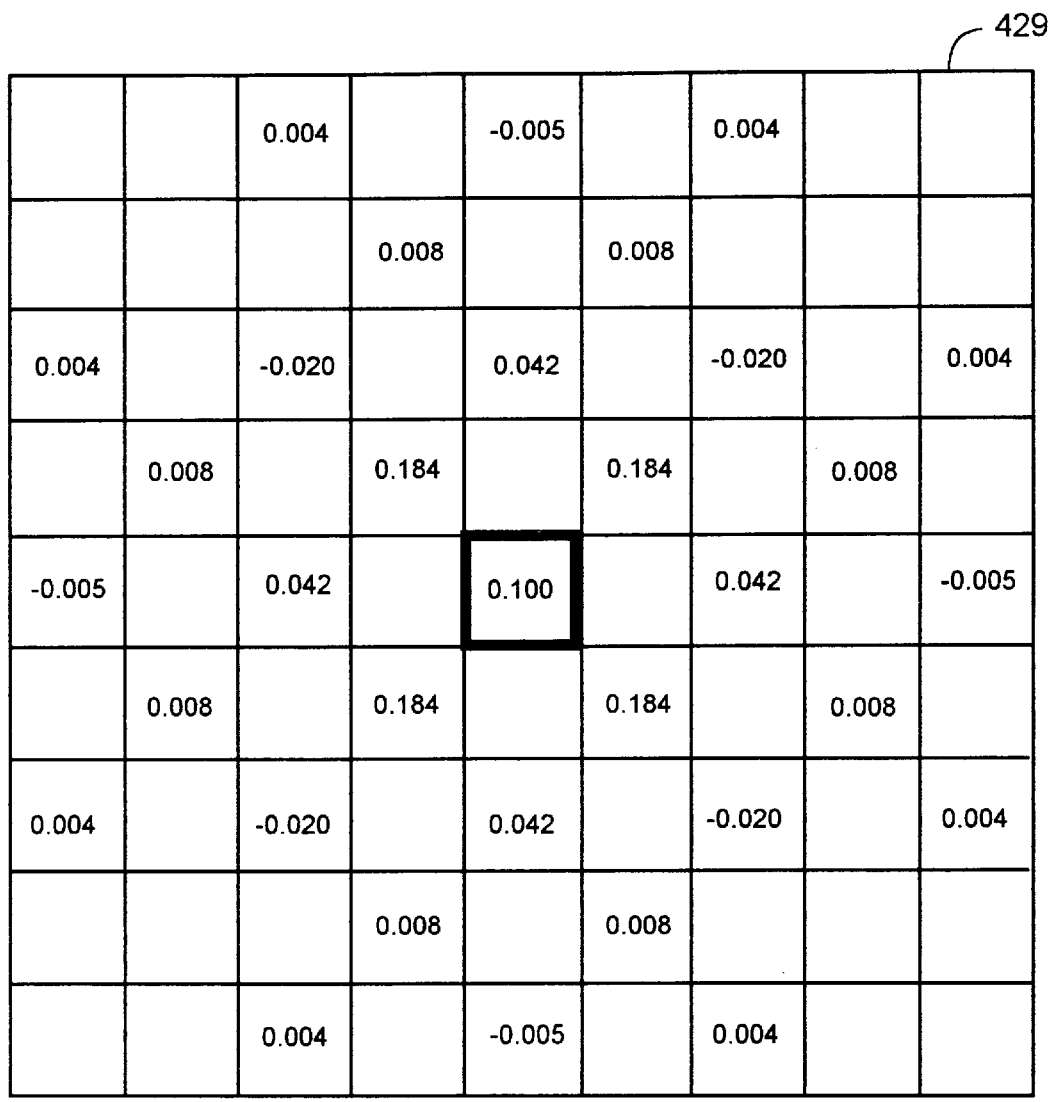

FIGS. 6A–6C show one specific example of a set of decoding patterns for the RGB M plane with the minimum cell 122 shown in FIG. 5.

In FIG. 6A, the two patterns shown 308 and 309 decode a missing R and a missing B pixel value at a location where there is a sampled G pixel value (indicated with the letter G in a circle. This position is also designated the center of the decode kernel or matrix). The letters R, B, and G in the decode matrices indicated sampled values in the M plane that are used to compute the missing values according to a summation technique such as described below. The blank boxes indicated locations in the M plane that are not used to decode the missing pixel values at the indicated current location.

The two kernels 308 and 309 are the sampled patterns for the missing values at the two G locations shown in 301. When either of those locations is the current location in the decode routine, the kernel 308 is placed with the kernel center over that location and samples are taken from the M plane as indicated by the kernels. These samples then have applied to them a weighting coefficient as described below and a summation is formed to determine the missing pixel value.

Pattern 308 and 309 are rotated in order to determine sampling patterns for other G locations in minimum cell 122. Patterns 308 and 039 are rotated 90 degrees clockwise for the two G locations indicated by 302, 180 degrees clockwise for the two G locations indicated by 303, and 270 degrees clockwise for the two G locations indicated by 304.

FIGS. 6B and 6C similarly indicate decoding patterns for missing values at locations holding a sampled R and B value respectively. Note that the two B values shown in 321 are identical in terms of their surrounding sampled value pattern, and therefore there is no need to rotate the pattern for different B locations.

Specific Examples of Decoding Coefficients

The patterns shown in FIGS. 6A–6C describe which sampled values in a neighborhood of a missing pixel value will be used in determining that missing value, but they do not specify what will be done with those samples to get the missing value.

One example of a method of decoding the missing pixel values is shown in FIGS. 7A–7H. FIGS. 7A–7H show specific examples of coefficient values that may be used with the decoding patterns shown in FIGS. 6A–6C to achieve a missing pixel value by performing a simple weighted summation in a neighborhood surrounding the missing pixel. These numerical coefficient values may be selected or tuned by human estimate and trial and error, or they may be developed by an automatic procedure described below.

As an example, FIG. 7A shows coefficients 408 that may be used to determine a missing red pixel value at positions with a G sampled value using pattern 308. As can be seen, the greatest single contribution comes from the value of the green sampled value at that location, which has a positive coefficient of 0.8, and surrounding R, G, and B values are assigned positive and negative coefficients to correlate the missing R value with what is happening in the other spectral planes in its neighborhood. The remaining example coefficient patterns similarly can be used with the patterns shown in FIGS. 6A–6C, with coefficient 409 corresponding to pattern 309, 418 to 318 and so on. The coefficient values are rotated along with the patterns as shown in FIGS. 6A–6C.

A consideration of the patterns and coefficients just discussed with the correlated decoding with speckle correction and other techniques as disclosed in the '066 patent will show that the computation using the present method can be accomplished much more quickly and require less computations per decoded pixel than the full '066 method. Also the decoding according to the present invention may be done in just one pass through a large image, rather than the multiple passes required by the '066 patent.

Generation of Decoding Coefficients and Patterns

The decoding patterns and coefficients shown in FIGS. 7A–H may be determined according to the invention by a variety of methods. As one example, the patterns and coefficients may be selected by trial and error, with an experienced spectral engineer using knowledge about the particular M plane pattern to be decoded and the desired quality of the resultant decoded image to select initial appropriate coefficients, and then iteratively decoding a number of sample images and adjusting coefficients as needed. For unique patterns and for specific applications, such as two color imaging for processing of bank documents, this "by hand" approach may be particularly appropriate.

General Principles for Systematic Decoding

According to another embodiment of the invention, decoding patterns are determined by following a multi-pass correlated decoding process similar to that described in the '066 patent. However, in the current invention, this multi-pass process is done only once, on just one a minimum cell of a particular M plane pattern, and then the coefficients derived can be applied using a simple summation to any image that is encoded with that M plane pattern.

To determine decoding coefficients, one more systematic method according to the invention first begins by determining the smallest possible 2-dimensional array, centered on the to-be-decoded location in the M plane, that contains at least one sample from each spectral plane. In the pattern shown in FIG. 3A, this would be a 3×3 array.

Next, rough coefficient values for the contributions of these surrounding sample values (between −1 and 1) are selected for these values, using an approximation of the procedure of correlated decoding described in the earlier cited '066 patent. This process is applied with two colors at a time, one color corresponding to the center and the other color corresponding to a circularly-symmetric array of samples around the center, even if some of the samples in the surrounding array are not of the chosen color.

If the image has more than two spectral components, it is necessary to specify several subsets of coefficients in order to adjust the rough values of coefficients corresponding to samples of the higher order spectral planes. These subsets of coefficients are calculated by applying the step above using a minimum cell centered on those samples and selecting a different pair of colors. Thus, additional sample positions beyond those within the initial minimum cell will become part of the decoding pattern. Some positions will have two or more coefficients, one being a rough value and one or more values computed for the subsets. At every pixel in the decoding pattern, all resulting coefficients should be linearly combined into a single one to produce the net effect upon the sample in that pixel.

Additional and optional procedures to improve the quality of the decoding, like speckle correction, are applied over the sampling patterns, which will be affected again in some of the positions that already have a coefficient.

Specific Implementation of Decoding Method

According to the invention, the coefficients also may be determined more precisely, following a method similar to the one disclosed in the '066 patent, with some refinements as described below, to determine a decoding kernel. As an example, a process for determining the coefficient pattern 419 is described below. This example will be used because it results in a small decoding kernel.

To decode a blue value at a red sample according to one embodiment, first apply the following equation on a 5×5 neighborhood, such as: $b = R - R_{avg} + B_{avg}$.

In order to generalize the method, the equation may be written with explicit offset coordinates from the pixel being decoded as follows:

$$4b_{(0,0)} = R_{(0,0)} - [R_{(0,0)} + R_{(-2,0)} + 4R_{(0,-2)} + 4R_{(0,+2)} + 4R_{(+2,0)}]/5 + [B_{(-1,-1)} + B_{(+1,+1)} + b_{0(-1,+1)} + b_{0(+1,-1)}]/4.$$

Multiplying through by 20 to make the coefficients integer yields:

$$20b_{(0,0)} = 2OR_{(0,0)} - 4R_{(0,0)} - 4R_{(-2,0)} - 4R_{(0,-2)} - 4R_{(0,+2)} - 4R_{(+2,0)} + 5B_{(-1,-1)} + 5B_{(+1,+1)} + 5b_{0(-1,+1)} + 5b_{0(+1,-1)}.$$

Gathering together like terms to get the weighted equation:

$$20b_{(0,0)} = 16R_{(0,0)} - 4R_{(-2,0)} - 4R_{(0,-2)} - 4R_{(0,+2)} - 4R_{(+2,0)} + 5B_{(-1,-1)} + 5B_{(+1,+1)} + 5b_{0(-1,+1)} + 5b_{0(+1,-1)}.$$

Comparing the coordinates in this equation to the M plane shown in 319, it is seen that some of the blue values from the equation are actually located on red samples in the M plane. At these pixels, the blue values also must be decoded, as follows:

$$20b_{(0,0)} = 16R_{(0,0)} - 4R_{(-2,-2)} - 4R_{(-2,+2)} - 4R_{(+2,-2)} - 4R_{(+2,+2)} + 5B_{(-2,0)} + 5B_{(+2,0)} + 5B_{(0,-2)} + 5B_{(0,+2)}.$$

The coordinates in this equation are relative to the pixel being decoded. Because blue values at $b_{0\,(-1,+1)}$ and $b_{0\,(+1,-1)}$ in the original equation are being decoded, add this coordinate shift to the $b_0$ equation:

$$20b_{0(-1,+1)} = 16R_{(-1,+1)} - 4R_{(-3,-1)} - 4R_{(-3,+3)} - 4R_{(+1,-1)} - 4R_{(+1,+3)} + 5B_{(-3,+1)} + 5B_{(+1,+1)} + 5B_{(-1,-1)} + 5B_{(-1,+3)};$$

$$20b_{0(+1,-1)} = 16R_{(+1,-1)} - 4R_{(-1,-3)} - 4R_{(-1,+1)} - 4R_{(+3,-3)} - 4R_{(+3,+1)} + 5B_{(-1,-1)} + 5B_{(+3,-1)} + 5B_{(+1,-3)} + 5B_{(+1,+1)}.$$

Now substitute these equations back into the original equation making sure to preserve the proper weights and collect like terms to obtain the final convolution kernel:

$$20b_{(0,0)} = 16R_{(0,0)} - 4R_{(-2,0)} - 4R_{(0,-2)} - 4R_{(0,+2)} - 4R_{(+2,0)} + 5B_{(-1,-1)} + 5B_{(+1,+1)} + 5b_{0(-1,+1)} + 5b_{0(+1,-1)};$$

$$20b_{(0,0)} = 16R_{(0,0)} - 4R_{(-2,0)} - 4R_{(0,-2)} - 4R_{(0,+2)} - 4R_{(+2,0)} + 5B_{(-1,-1)} + 5B_{(+1,+1)} +$$
$$5[\{16R_{(-1,+1)} - 4R_{(-3,-1)} - 4R_{(-3,+3)} - 4R_{(+1,-1)} - 4R_{(+1,+3)} + 5B_{(-3,+1)} + 5B_{(+1,+1)} + 5B_{(-1,-1)} + 5B_{(-1,+3)}\}/20] +$$
$$5[\{16R_{(+1,-1)} - 4R_{(-1,-3)} - 4R_{(-1,+1)} - 4R_{(+3,-3)} - 4R_{(+3,+1)} + 5B_{(-1,-1)} + 5B_{(+3,-1)} + 5B_{(+1,-3)} + 5B_{(+1,+1)}\}/20]$$

Multiply through by 4 to keep all of the coefficients integer:

$$80b_{(0,0)} = 64R_{(0,0)} - 16R_{(-2,0)} - 16R_{(0,-2)} - 16R_{(0,+2)} - 16R_{(+2,0)} + 2OB_{(-1,-1)} + 2OB_{(+1,+1)} + 16R_{(-1,+1)} - 4R_{(-3,-1)} - 4R_{(-3,+3)} - 4R_{(+1,-1)} - 4R_{(+1,+3)} + 5B_{(-3,+1)} + 5B_{(+1,+1)} + 5B_{(-1,-1)} + 5B_{(-1,+3)} + 16R_{(+1,-1)} - 4R_{(-1,-3)} - 4R_{(-1,+1)} - 4R_{(+3,-3)} - 4R_{(+3,+1)} + 5B_{(-1,-1)} + 5B_{(+3,-1)} + 5B_{(+1,-3)} + 5B_{(+1,+1)}$$

Now gather up the like terms, and printing terms out according to their rows in the decode matrix 419.

$$80b_{(0,0)} = -4R_{(-3,-1)} + 5B_{4(-3,+1)} - 4R_{(-3,+3)} - 16R_{(-2,0)} - 4R_{(-1,-3)} + 3OB_{(-1,-1)} + 12R_{(-1,+1)} + 5B_{(-1,+3)} - 16R_{(0,-2)} + 64R_{(0,0)} - 16R_{(0,+2)} + 5B_{(+1,-3)} + 12R_{(+1,-1)} + 3OB_{(+1,+1)} - 4R_{(+1,+3)} - 16R_{(+2,0)} - 4R_{(+3,-3)} + 5B_{(+3,-1)} - 4R_{(+3,+1)}.$$

Divide all coefficients in the equations by 80 to get the coefficients shown in 419.

The above is just one example of the computation of the convolution kernels. Actual kernels used in real world applications may involve many more steps, which is not problematic because the computation need be done only once for a particular pattern and then the coefficients will be used to decode actual images. The actual decoding of a pixel in the '066 patent also involved many more steps for some of the refinement procedures.

In actual practice, some approximations are made to large convolution kernels which resulted from large neighborhood operations such as combining the final strong plane decoding step with the pattern reduction/resaturation step. These kernels turned out to be large (45×45), but dropped off to small values quickly and therefore were clipped arbitrarily to keep their size small but remain functional. This is why the convolution kernels of the present invention are close, and in fact perceptually indistinguishable to the human eye, but not numerically equivalent to the full process described in the '066 patent.

To test the accuracy of the calculations, in one embodiment, the sum of the coefficients in a particular kernel for sample values in the same spectral plane as the missing value should be one, and the individual sums of the coefficient values in each of the other spectral planes should be zero.

Specific Circuit Embodiments

Figure 8:
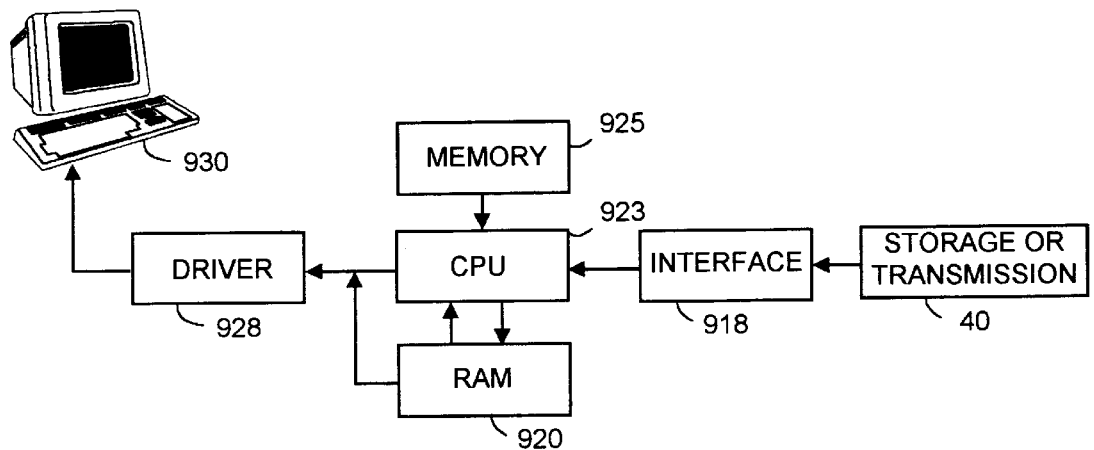
FIG. 8 is a schematic block diagram of a system for compression of images designed to operate in accordance with one embodiment of the invention.

FIG. 8 is a block diagram of a general purpose system designed to practice the demultiplexing and decoding functions of the invention. FIG. 8 shows a general purpose system designed to receive, decompress and display images represented as a compressed data set. Interface circuit 918 receives the signals from storage or transmission device 40 and stores the compressed data set in random access memory (RAM) 920.

Central processing unit (CPU) 923 may be either a standard microprocessor which is part of a general purpose computer or a specially constructed microprocessor. Memory 925 contains instructions that direct CPU 923 in processing of a compressed data set according to the invention. As CPU 923 performs these decoding functions, the decoded data is stored in RAM 920. Once the decoding functions are complete, a resulting RGB decoded image in RAM 920 is transmitted to display driver 928 for display on output device 930.

Improving the resolution of a multi-CCD camera

Figure 9:
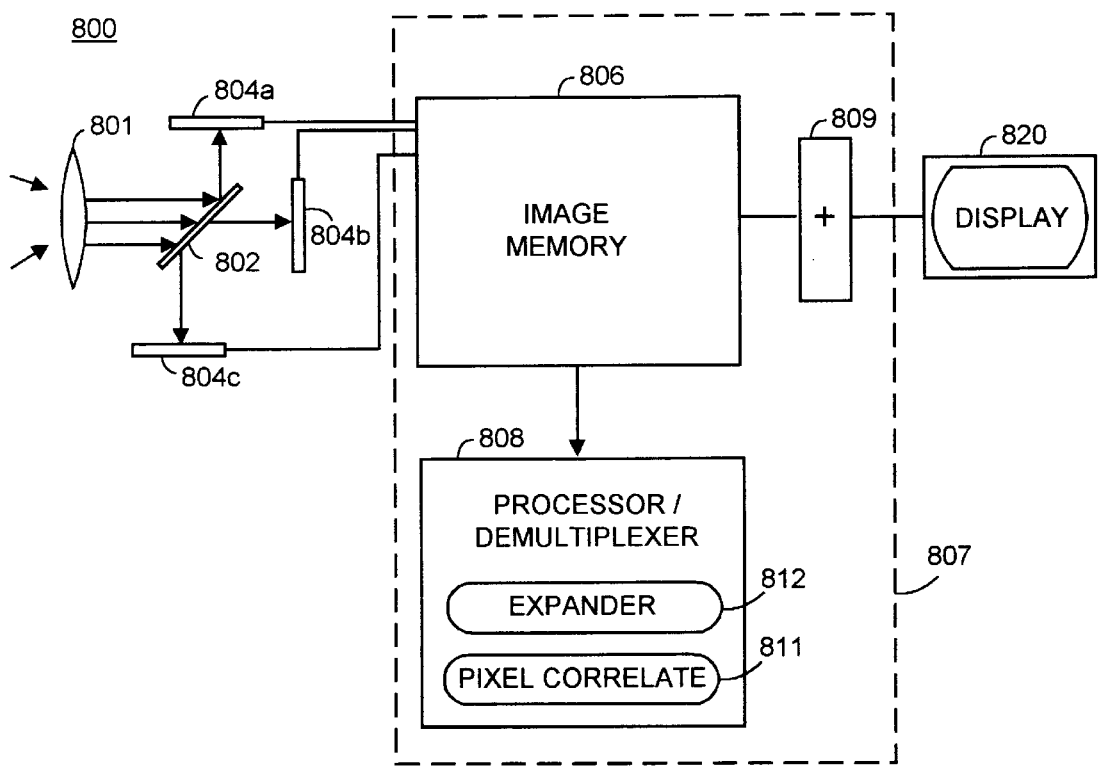
FIG. 9 is a schematic block diagram of a three sensor CCD camera with enhanced resolution in accordance with an additional embodiment of the invention.

In a further aspect of the invention, the invention may be used to increase the resolution of a multi-spectral imaging device that uses multiple CCD sensors by applying the improved method of the invention to a system like that discussed in the '825 patent application. In one specific example of this embodiment, as shown in FIG. 9, a digital camera employs two or more separate CCD arrays to capture separate and complete spectral component planes with the sensors deliberately offset one from another by a fraction of a pixel (for example, one half a pixel), with a possible filling method to construct an M plane having a higher resolution than any of the individual CCD arrays. The M plane could then be decoded according to the methods of the invention.

The Invention as Embodied in a computer readable medium

Figure 10:
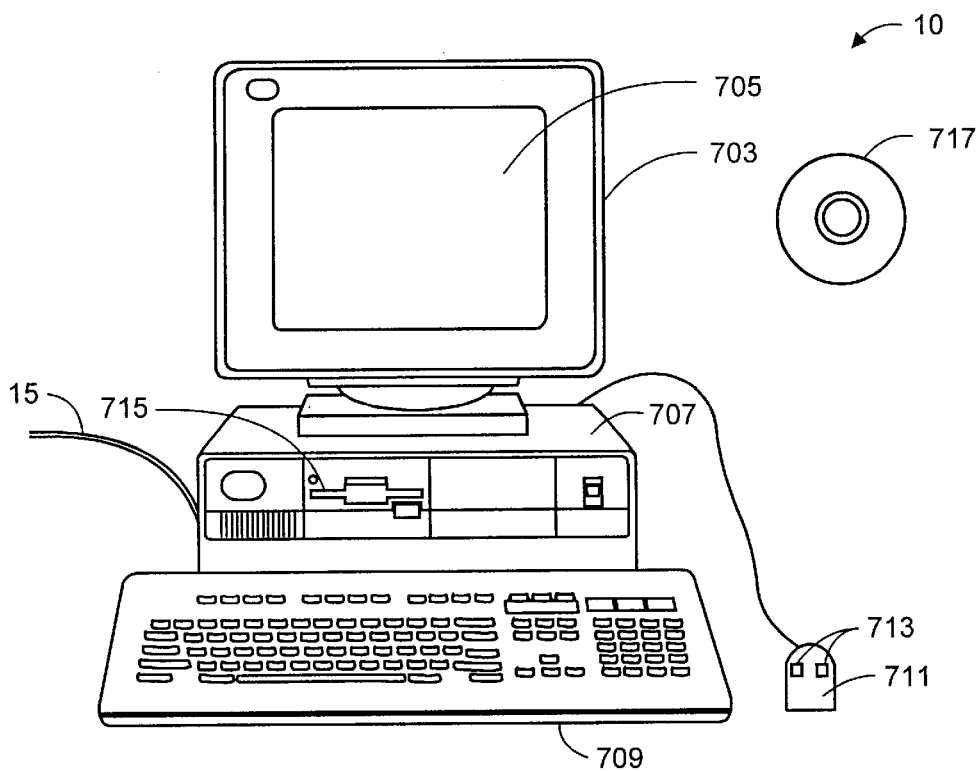
FIG. 10 is a block diagram of a computer system with an ability to read a computer readable medium allowing the system to operate in accordance with the invention.

FIG. 10 illustrates an example of a computer system used to execute the method of present invention when implemented in general purpose software according to one embodiment. FIG. 10 shows a computer system 10 which includes a monitor 703, screen 705, cabinet 707, keyboard 709, and mouse 711, Mouse 111 may have one or more buttons such as mouse buttons 113. Cabinet 107 is shown housing a disk drive 715 for reading a CD-ROM or other type disk 117. Cabinet 707 also houses familiar computer components (not shown) such as a processor, memory, disk drives, and the like, as well as an adaptor 1 for connection to a network medium 15.

Figure 11:
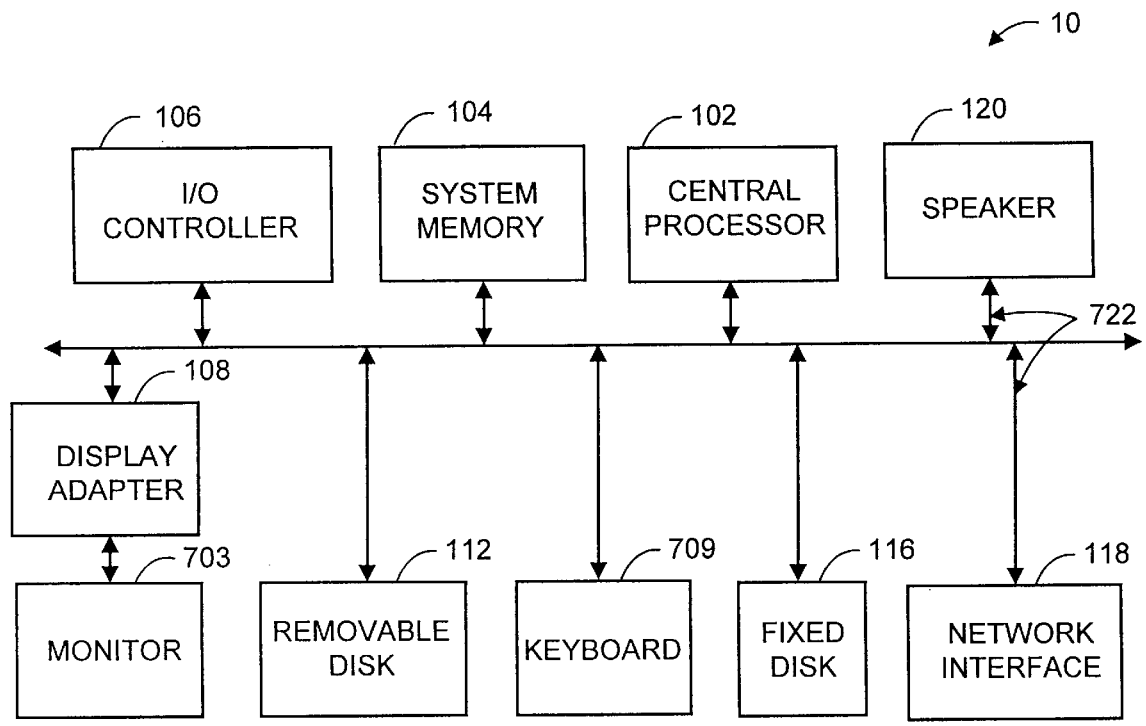
FIG. 11 shows a system block diagram of computer system 10 used to execute a software embodiment of the present invention.

FIG. 11 shows a system block diagram of computer system 10 used to execute the software of the present invention. As in FIG. 10, computer system 10 includes monitor 703 and keyboard 709. Computer system 10 further includes subsystems such as a central processor 722, system memory 724, I/O controller 726, display adapter 728, serial port 732, disk 736, network interface 738, adaptor 1 and speaker 740. Computer readable media such as memory, hard disks, floppies, CD-ROMs, tapes, flash memory, and the like may be used to store a computer program including computer code that implements the present invention. Other computer systems suitable for use with the present invention may include additional or fewer subsystems. For example, another computer system could include more than one processor 722 (i.e., a multi-processor system) or a system may include a cache memory.

Arrows such as 722 represent the system bus architecture of computer system 10. However, these arrows are illustrative of any interconnection scheme serving to link the subsystems. For example, speaker 740 could be connected to the other subsystems through a port or have an internal direct connection to central processor 722. Computer system 10 shown in FIG. 11 is but an example of a computer system suitable for use with the present invention. Other configurations of subsystems suitable for use with the present invention will be readily apparent to one of ordinary skill in the art.

The invention has now been explained with reference to specific embodiments. Other embodiments will be apparent to those of skill in the art. It is therefore not intended that this invention be limited, except as indicated by the appended claims.

What is claimed is:

1. An image decoder capable of decoding a spatiochromatically multiplexed image plane into multiple spectral planes comprising:

an image storage capable of receiving and storing said spatiochromatically multiplexed image plane, said plane comprised of a plurality of original pixels, each original pixel representing a substantially non-overlapping subregion of said spatiochromatically multiplexed image plane;

memory for storing a plurality of two-dimensional decoding patterns of coefficients for decoding said spatiochromatically multiplexed image plane aid coefficients having at least two different values;

a processor capable determining a missing pixel value at a location in one of said multiple spectral planes substantially in one summation step by applying said patterns of coefficients to original pixels in at least two of said multi-spectral planes in a two-dimensional region of said multiplexed plane to compute a weighted summation.

2. The apparatus according to claim 1 further comprising an optical digital capturing system comprising;

a plurality of spectral component sensors for capturing a spatiochromatically multiplexed plane;

an image splitter capable of splitting spectral energy from an image source such that said spectral energy reaches each of said spectral component sensors, said sensors and said image splitter arranged so that spectral energy falling on at least one such sensor is offset a faction of a pixel from the spectral energy falling on another such sensor thereby generating said spatiochromatically multiplexed image plane for storage in said image storage;

wherein said multiple spectral planes, after processing, have enhanced resolution over any one said component sensors.

3. The apparatus according to claim 2 wherein each said spectral component sensor comprises an array of pixel detectors, one sensor being a red sensor, one sensor being a green sensor, and one sensor being a blue sensor and each sensor is offset laterally a fraction of a pixel;

and wherein resolution is enhanced in at least one spectral component plane by applying said decoding patterns to determine an interstitial pixel value in said plane.

4. The decoder according to claim 1 wherein said plurality of decoding patterns comprises different patterns of coefficients for decoding missing pixel values determined by said missing pixels locations in a cell of said multiplexed plane.

5. The decoder according to claim 4 wherein said coefficients include positive and negative coefficients in a two-dimensional arrangement.

6. The decoder according to claim 4 wherein said decoding patterns are initially generated according to an automated process of correlated decoding comprising setting a missing pixel value so that a first difference value between said missing pixel value and a local average value in one of said multiple spectral planes is correlated to a second difference value between a known pixel value at a corresponding pixel location in a different spectral plane and a local average in said different spectral plane.

7. The decoder according to claim 4 wherein said decoding patterns are adjusted by an iterative process of visually examining decoded images and adjusting coefficient values to (a) minimize coefficient pattern complexity while preserving an acceptable visual image, and/or (b) optimize image quality.

8. The decoder according to claim 4 wherein said decoding patterns are adjusted by any number of additional image processing techniques including techniques to reduce speckles, reduce image blurriness, or reduce pattern noise.

9. The decoder according to claim 4 wherein said multi-spectral planes comprise a red plane a green plane, and a blue plane.

10. The decoder according to claim 4 wherein said patterns of coefficients are substantially as shown and described in FIGS. 6A–C.

11. The decoder according to claim 4 wherein said values of said coefficients are approximately equal to values shown and described in FIGS. 7A–H.

12. The decoder according to claim 1 wherein said plurality of patterns comprise different patterns of coefficients for decoding each missing pixel value at different locations in a minimum two-dimensional cell of said multiplexed plane and wherein said coefficients include positive and negative coefficients and wherein said one summation step performs interpolation and corrects for artifacts.

13. An apparatus for decoding a multi-spectral image wherein said multi-spectral image is represented as a spatially multiplexed image plane comprising:

a first digital storage area for capturing the multi-spectral image as a spatially-multiplexed digitized image plane, said image plane comprising at each pixel location a representation of a single spectral component;

a second digital storage area for expanding said spatially-multiplexed digitized image plane into a plurality of separable component planes, said separable component planes initially composed of a plurality of pixels of known value and a plurality of pixels with missing values;

a third digital storage area for storing a plurality of two-dimensional patterns of weighted coefficients, each pattern comprising coefficients of at least two different values, each pattern used to compute values at a plurality of missing pixel locations;

a summation engine for applying said plurality of patters to said multi-spectral image to compute missing pixel values; and a displaying device for presenting said plurality of reconstructed separable planes as a visual image.

14. The decoder according to claim 13 wherein said multi-spectral image is a color image comprising a digitized red plane, a digitized green plane, and a digitized blue plane.

15. A method for enhancing image resolution in a digital camera comprising a plurality of spectral sensors, each sensor comprised of an array of pixel detectors, comprising:

offsetting each sensor a fraction of a pixel in a lateral direction from each other sensor;

capturing a multi-spectral image in at least two separable digitized planes using said offset sensors, said separable digitized planes having a number of pixel storage locations greater then the number of pixel detectors in said sensors, said separable planes only partially filled by pixel values from said sensors;

determining a missing pixel value in said separable planes by applying one of a set of two-dimensional pattern of coefficients, to generating a weighted summation of captured pixel values approximating said missing pixel value; and combining said plurality of reconstructed separable planes into an enhanced resolution multi-spectral image.

16. A fixed computer readable medium containing computer executable program code that when loaded into an appropriately configured computer system will cause the computer to perform the method of claim 15.

17. The method according to claim 15 wherein said image is captured by three sensors, a sensor for red light, a sensor for green light and a sensor for blue light and further comprising the step of average plane decoding whereby a fourth image plane is computed prior to said correlated decoding step, said fourth plane computed by interpolating said missing pixel values from present values in one of said captured planes.

18. The method according to claim 17 further comprising:

producing at least a fourth separable digitized image plane from one of said red, blue, or green planes, said fourth plane comprising a pixel value at each pixel location that corresponds to a location where there is no detected red, green,, or blue value;

determining missing pixel values in said separable planes by applying weighted coefficients to sampled pixel values to determine missing values; and presenting said plurality of reconstructed planes as a visual image.

19. The method according to claim 18 further comprising providing an aperture at each sensor such that the light detected at each pixel detector is limited primarily to light falling near the center of the detector.

* * * * *